SHIFT REGISTER USING BIDIRECTIONAL PUSH-PULL GATES WHOSE OUTPUT IS DETERMINED BY STATE OF ASSOCIATED FLIP-FLOP

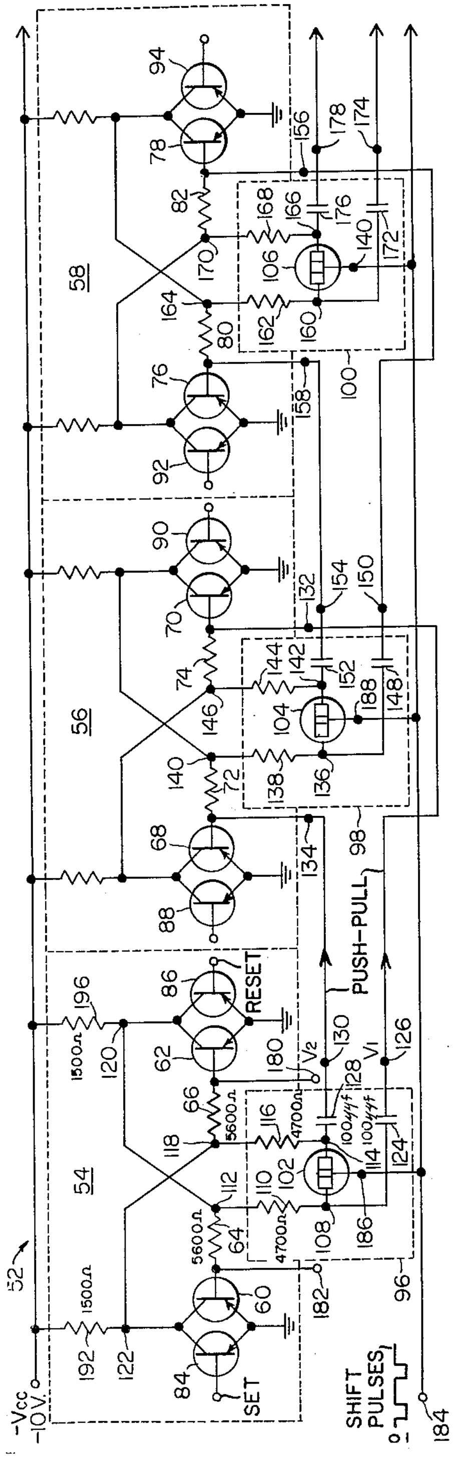
Fig. 1
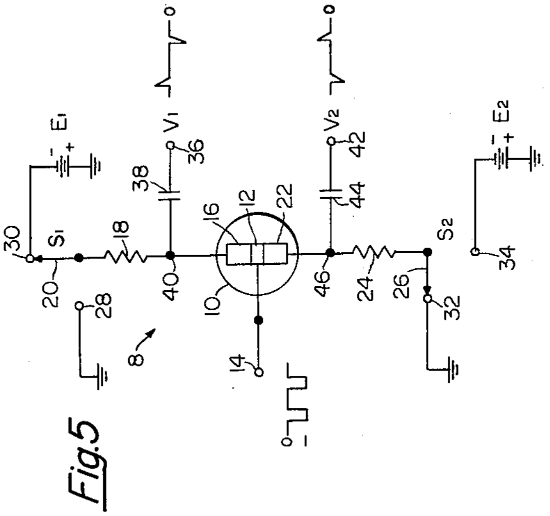
Fig.5
| | $S_1$ | $S_2$ | $V_1$ | $V_2$ |
|---|---|---|---|---|
| 1 | 0 | 0 | 0 | 0 |
| 2 | 1 | 0 | (-) | (+) |
| 3 | 0 | 1 | (+) | (-) |
| 4 | 1 | 1 | 0 | 0 |
Fig 6
| | 54 | 56 | 58 |
|---|---|---|---|
| 1 | 0 | 0 | 0 |
| 2 | 0 | 0 | 1 |
| 3 | 1 | 1 | 0 |
| 4 | 1 | 1 | 1 |
Fig.3
| | 54 | 56 | 58 |
|---|---|---|---|
| 1 | 0 | 0 | 1 |
| 2 | 0 | 1 | 0 |
| 3 | 1 | 0 | 1 |
| 4 | 1 | 1 | 0 |
Fig. 2
INVENTOR.
EDWARD GARY CLARK
BY Edward W. Hughes
ATTORNEY Aug. 28, 1962 E. G. CLARK 3,051,848

Filed June 3, 1957 2 Sheets-Sheet 2

INVENTOR.

EDWARD GARY CLARK

BY *Edward W. Hughes*

ATTORNEY 3,051,848

SHIFT REGISTER USING BIDIRECTIONAL PUSH-PULL GATES WHOSE OUTPUT IS DETERMINED BY STATE OF ASSOCIATED FLIP-FLOP

Edward Gary Clark, Oreland, Pa., assignor to Burroughs Corporation, Detroit, Mich., a corporation of Michigan
Filed June 3, 1957, Ser. No. 663,162
9 Claims. (Cl. 307—88.5)

This invention relates to means for causing one bistable device to assume a stable state corresponding to the stable state of another bistable device, and more particularly to shift registers.

A bistable device, or a flip-flop, may be defined as a device having two stable states and two input terminals (or types of input signals), each of which corresponds with one of the two states. A flip-flop will remain in either state until caused to change to the other state by application of the corresponding signal or signals.

In data processing machines the state of a flip-flop may be used to represent binary data. It is frequently desirable to transfer this data to a second flip-flop in response to a control signal by causing the second flip-flop to assume a stable state corresponding to that of the first. A shift register is an extension of this concept to a number of flip-flops for the purpose of storing and manipulating binary data. Upon the application of a control signal, such as a shift pulse, to such a register, the data, or information, represented by the stable state of each flip-flop in the register may be shifted or transferred to another flip-flop in the same register. Displacing the binary information stored in a register one place to the left is the equivalent of multiplying the information by the radix 2, and displacing the information stored in a register one place to the right is the equivalent of dividing the stored information by the radix 2.

The shift register described and claimed herein uses gates which rely on certain unique characteristics of junction transistors. A junction transistor consists of a semiconductive body, for example, of germanium or silicon, having an intermediate zone of one conductivity type, N or P, between and contiguous with two outer zones of the opposite conductivity type. Emitter and collector connections are made respectively to the outer zones, and a third connection, the base connection, is made to the intermediate zone. Between the two outer zones and the intermediate zone, or the base, there are defined two junctions, normally referred to as the emitter junction and the collector junction. The collector junction is normally biased in the reverse, or high resistance, direction, and the emitter junction is normally biased in the forward, or low resistance, direction. With the exception of certain types of transistors, the areas of the junctions between the outer zones and the intermediate zone are similar and there is, in general, no physical or electrical characteristic which will identify one outer zone as an emitter and the other outer zone as a collector. There is a functional difference between an outer zone acting as an emitter and an outer zone acting as a collector. However, whether a given outer zone acts as an emitter or as a collector is determined solely by the bias across its junction with the intermediate zone.

The gates of the shift register constituting this invention, use the bidirectional characteristics of transistors; and these particular gates are an improvement over those disclosed in my copending application, Serial No. 642,767, filed February 27, 1957, entitled "Transistor Shift Register," now U.S. Patent 2,907,898.

The shift register constituting this invention is comprised of a plurality of flip-flops. Each flip-flop has associated with it, in general, a bidirectional gate. Each bidirectional gate is directly connected to the flip-flop with which it is associated, which flip-flop is also referred to as being the transferor flip-flop. Each gate is capable of producing two different types of push-pull output signals in response to the application of a control signal or shift pulse. The type of output signal produced by a given gate is determined by the stable state of the transferor flip-flop with which the gate is associated at the time a shift pulse is applied to the gate. The output pulses of a gate are applied to the input terminals of a transferee flip-flop. These output signals, when applied to the input terminals of a transferee flip-flop, will cause the transferee flip-flop to assume a stable state corresponding to the type of output signal produced.

There is no need to limit the width, or duration of each shift pulse applied to these improved bidirectional gates since output pulses are produced only by the leading edge of each shift pulse. A subsequent change of state of the transferor flip-flop while a shift pulse is present or applied to its associated gate will not cause these gates to produce additional output pulses.

It is, therefore, an object of this invention to provide simplified means for causing one bistable device to assume a stable state corresponding to the stable state of another bistable device.

It is a further object of this invention to provide a transistor shift register in which the number of transistors required is minimized.

It is another object of this invention to provide a shift register using a simplified gate which requires but a single gate to be connected between each transferor and transferee flip-flop.

It is still another object of this invention to provide a shift register having bidirectional gates in which each bidirectional gate produces push-pull output signals.

It is a still further object of this invention to provide a shift register having bidirectional gates in which each bidirectional gate produces two different types of push-pull output signals.

It is a further object of this invention to provide a shift register having gates which have current-gain characteristics.

It is still another object to provide a shift register having a simplified bidirectional transistor gate, in which the width of each shift pulse applied to the bidirectional gates may be substantially of any duration.

Other objects and many of the attendant advantages of this invention will be readily appreciated as the same become better understood by reference to the following detailed description when considered in connection with the accompanying drawing; wherein:

FIG. 1 is a schematic diagram of a portion of a shift register;

FIG. 2 and FIG. 3 are charts illustrating the operation of the bistable circuit in FIG. 1;

FIG. 5 is a schematic diagram illustrating the operation of an improved bidirectional gate; and FIG. 6 is a chart illustrating the operation of the circuit of FIG. 5.

Figure 4:
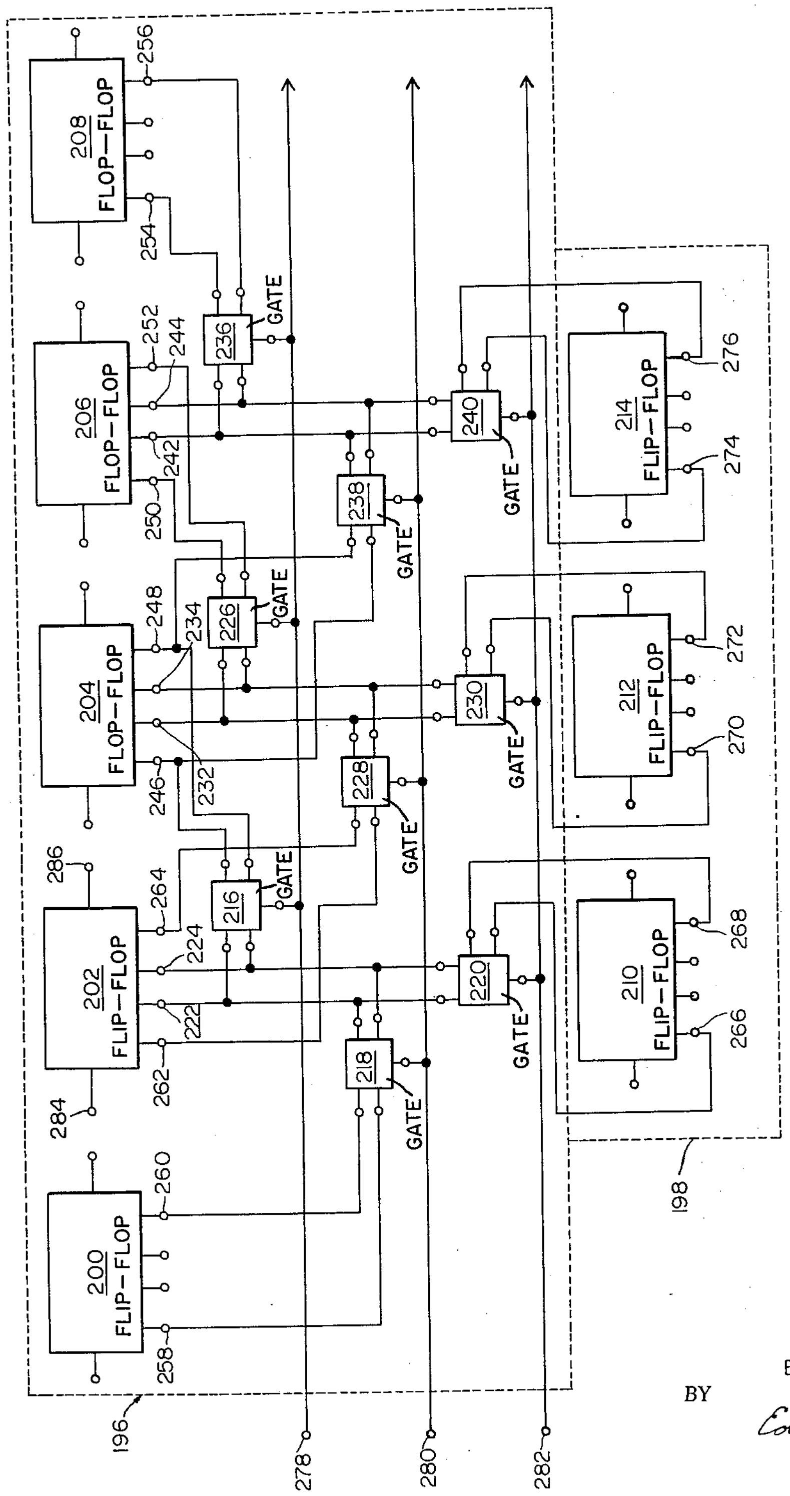
FIG. 4 is a block diagram of a shift register having provisions to shift right, to shift left, and to read-in, in parallel, binary data.

Before describing the operation of a portion of a shift register such as is illustrated in FIG. 1, an explanation of the principles of operation of the simplified bidirectional gate will be made. In FIG. 5 there is illustrated a bidirectional gate 8, the essential element of which is a p-n-p bidirectional junction transistor 10. Base, or intermediate zone 12 of transistor 10, is connected to terminal 14. Outer zone 16 of bidirectional transistor 10 is connected through resistor 18 to the movable arm 20 of single-pull double-throw switch $S_1$. Outer zone 22 of bidirectional transistor 10 is connected through resistor 24 to the movable arm 26 of switch $S_2$.

Terminal 28 of switch $S_1$ is connected to a point at reference, or ground, potential, and terminal 30 of switch $S_1$ is connected to a suitable source of negative potential $E_1$ which is illustrated schematically as a battery. Terminal 32 of switch $S_2$ is connected to ground, and terminal 34 of switch $S_2$ is connected to a suitable source of negative potential $E_2$ which is also illustrated schematically as a battery. When transistor 10 is of the p-n-p type, negative going pulses are adapted to be applied to terminal 14, the magnitude of these pulses, is, however, normally less than the magnitudes of either $E_1$ or $E_2$. Output terminal 36 is connected by capacitor 38 to terminal 40, which is between outer zone 16 of bidirectional transistor 10 and resistor 18. Output terminal 42 is connected by capacitor 44 to terminal 46 which is between resistor 24 and outer zone 22. Changes in potential of terminal 40 are coupled by capacitor 38 to output terminal 36 as pulses $V_1$. Similarly, changes in potential of terminal 46 are coupled by capacitor 46 to output terminal 42 as pulses $V_2$.

A first range of voltages which substantially coincides with the range of the base voltages necessary to cut off the type of transistors used in the circuit configuration illustrated, is denoted "0"; in a preferred example "0" represents a range of from 0.0 v. to —0.1 v. A second range of voltages, which substantially coincides with the range of the base voltage necessary to saturate, or bottom the type of transistors used in the circuit configuration illustrated, is denoted "1"; in a preferred example "1" represents a range of from —0.3 v. to $-v_{cc}$. With arm 20 contacting terminal 28, outer zone 16 is connected to a point within the "0" voltage range. Similarly with arm 26 contacting terminal 32, outer zone 22 is also connected to a point within the "0" voltage range. The application of a negative pulse to terminal 14 will cause substantially no current to flow through bidirectional transistor 10 and resistors 18, 24, since the junction between outer zone 16 and base 12 and the junction between outer zone 22 and base 12 of bidirectional transistor 10 are both forward biased. Voltage pulses $V_1$, $V_2$ having negligible amplitudes are produced at terminals 36, 42. The amplitudes of the output pulses $V_1$, $V_2$ produced when both outer zones of bidirectional transistor 10 are connected to points, or sources, within the "0" voltage range and when a pulse is applied to terminal 14 are within the "0" voltage range.

The numbers in the first line of FIG. 6 in the columns headed $S_1$, $S_2$ thus described the first of four possible conditions of bidirectional gate 8. The numbers in the first line of FIG. 6 under the columns headed $V_1$, $V_2$ describe the range of amplitudes of the output pulses produced at terminals 36, 42 when a shift pulse is applied to gate 8 while gate 8 is in this first condition.

If arm 20 of switch $S_1$ is placed in contact with terminal 30, outer zone 16 of bidirectional transistor 10 is connected to a point within the "1" voltage range. If arm 26 of switch $S_2$ is placed in contact with terminal 32, outer zone 22 will be connected to a point within the "0" voltage range. The junction between outer zone 16 and base 12 of bidirectional transistor 10 will be reverse biased, and the junction between outer zone 22 and base 12 will be forward biased while a negative pulse is applied to terminal 14. Transistor action will take place while the negative pulse is applied and current will flow through resistor 24, bidirectional transistor 10 and resistor 18. The sudden increase in current flowing through bidirectional transistor 10 resulting from the application of a negative pulse to terminal 14 will cause a negative going pulse to be produced at output terminal 42 and simultaneously a positive going pulse to be produced at output terminal 36. The amplitude and widths of the output pulses $V_1$ and $V_2$ at terminals 36, 42 are determined respectively by the time constants of the differentiating circuit which includes capacitor 38, and the impedance of the circuit connected to terminal 36 and the differentiating circuit which includes capacitor 44 and the impedance of the circuit connected to terminal 42. The circuit constants of the differentiating circuits are so arranged that the amplitudes of the output pulses at terminals 36, 42, under these circumstances, will be within the "1" voltage range.

Negative voltages within the range of —0.3 v. to $-v_{cc}$ have been denoted as "1." As a consequence, a negative going pulse having an amplitude within the "1" voltage range will be denoted (+)1, and a positive going pulse having an amplitude within the "1" voltage range will be denoted (—)1. The numbers in the second line of FIG. 6 in the columns headed $S_1$ and $S_2$ describe the second condition of bidirectional gate 8. The numbers in the second line of FIG. 6, under the columns headed $V_1$ and $V_2$ describe the magnitudes and polarities of the output pulses produced when a shift pulse is applied to gate 8 when it is in its second condition.

The amplitude of the negative pulse applied to input terminal 14 is such that bidirectional transistor 10 very quickly becomes saturated, or bottomed. When bidirectional transistor 10 is saturated, the resistance between its two outer zones is very small when compared with the magnitudes of resistors 24, 18, so that terminals 40, 46 may be considered as being directly connected together. The potentials of the terminals 40, 46 will be substantially equal, and have values approximating $$\frac{-E_1}{2}$$

If, while a pulse is applied to terminal 14, switches $S_1$, $S_2$ were quickly changed so that arm 20 contacts terminal 28 and arm 26 contacts terminal 34, the potentials of terminals 40, 46 will then have values approximating $$\frac{-E_2}{2}$$

There will be not output pulses produced having amplitudes within the "1" voltage range at terminals 36, 42 since there is substantially no change in the potentials of terminals 40, 46 as a result of this reversal of polarities; particularly where $-E_1 = -E_2$ and resistors 18, 24 are substantially equal.

If arm 20 of switch $S_1$ is moved to contact terminal 28, then outer zone 16 is connected to a point in the "0" voltage range. If arm 26 of switch $S_2$ is moved to contact terminal 34, outer zone 22 is connected to a point within the "1" voltage range. The junction between outer zone 16 and base 12 will be forward biased, and the junction between outer zone 22 and base 12 will be reverse biased when a negative pulse is applied to terminal 14. When such a pulse is applied under these conditions, current will flow through resistors 18 and 24. The direction of flow is such that output pulse $V_1$ produced at terminal 36 will be negative going and output pulse $V_2$ produced at terminal 42 will be positive going. The numbers in line 3 of FIG. 6 in the columns headed $S_1$ and $S_2$ describe the third condition of bidirectional gate 8. When gate 8 is in this third condition, the magnitude and polarity of the output pulse $V_1$ produced at terminal 36 may be denoted as +1 and the magnitude and polarity of output pulse $V_2$ produced at output terminal 42 may be denoted as —1. A rapid change of the condition of the gate from the third condition to the second condition, while a shift pulse is present at terminal 14, will not produce output pulses, for the reasons stated above.

If arm 20 of switch $S_1$ is connected to terminal 30, then outer zone 16 is connected to a point within the "1" voltage range. If arm 26 of switch $S_2$ is connected to terminal 34, then outer zone 22 is also connected to a point within the "1" voltage range. The junction between outer zone 16 and base 12 will be forward biased and likewise the junction between outer zone 22 and base 12 will be forward biased when a negative pulse is applied to input terminal 14 and base 12 of bidirectional transistor 10. As a result, there will be no transistor action and substantially no current will flow through bidirectional transistor 10 and resistors 18, 24 when the gate is in this condition. There will be substantially no output pulses produced at output terminal 36, 42. The numbers in the fourth line of FIG. 6 under the columns headed $S_1$ and $S_2$ identify the fourth condition of bidirectional gate 8. When gate 8 is in this condition the amplitudes of output pulses $V_1$, $V_2$ produced at terminals 36, 42, are within the "0" voltage range and are described by the columns headed $V_1$ and $V_2$.

A perusal of the chart of FIG. 6 shows that when a bidirectional gate is in the first and fourth conditions, the amplitudes of the output pulses $V_1$, $V_2$ are within the "0" voltage range. When a bidirectional gate is in the second and third condition, the amplitudes of the output pulses $V_1$, $V_2$ are in the "1" voltage range. When the bidirectional gate of FIG. 5 is in its second condition, it produces push-pull output pulses of one type; and when it is in its third condition, it produces push-pull output pulses of a second type. The chart of FIG. 6, with the exception of the polarities of $V_1$, $V_2$ describes the "exclusive or" logical function. A gate such as that illustrated in FIG. 5 may thus be referred to as a push-pull "exclusive or" circuit.

In FIG. 1 a portion of a shift register 52 is illustrated; included in this portion are flip-flops 54, 56, 58. Flip-flop 54 consists of transistors 60, 62 which are cross-coupled by base resistors 64, 66 to form a bistable device. Flip-flop 56 consists of transistors 68, 70 which are cross-coupled by base resistors 72, 74 to form a second bistable device. Flip-flop 58 consists of transistors 76, 78 which are cross-coupled by base resistors 80, 82 to form a third bistable device. Each of the flip-flops 54, 56, 58 is provided with means for placing it in either of its two stable states. Bistable device 54 is provided with a set transistor 84 which is connected in parallel with transistor 60 and with a reset transistor 86 which is connected in parallel with transistor 62. Bistable device 56 is provided with a set transistor 88 which is connected in parallel with transistor 68 and with a reset transistor 90 which is connected in parallel with transistor 70. Bistable device 58 is provided with a set transistor 92 which is connected in parallel with transistor 76 and a reset transistor 94 which is connected in parallel with transistor 72.

In FIG. 1 each of the flip-flops 54, 56, 58 is associated with a simplified bidrectional gate. Flip-flop 54 is associated with gate 96, flip-flop 56 is associated with gate 98, and flip-flop 58 is associated with gate 100. Each of the gates 96, 98, 100 is provided respectively with bidirectional transistor 102, 104, 106. Outer zone terminal 108 of bidirectional transistor 102 is connected by gate resistor 110 to output terminal 112 of flip-flop 54. The other outer zone terminal 114 of bidirectional transistor 102 is connected by gate resistor 116 to output terminal 118 of flip-flop 54. Output terminal 112 is directly connected to collector terminal 120 of transistor 62, and output terminal 118 is directly connected to collector terminal 122 of transistor 60. Output terminals 112, 118 of flip-flop 54 also serve as input terminals of gate 96.

Capacitor 124 is connected between outer zone 108 of bidirectional transistor 102 and output terminal 126 of gate 96. Similarly capacitor 128 is connected between outer zone 114 of bidirectional transistor 110 and output terminal 130. Output terminal 126 of gate 96 is directly connected to the input terminal 132 of flip-flop 56, and output terminal 130 is directly connected to the input terminal 134 of flip-flop 56. Input terminal 132 of flip-flop 56 is directly connected to the base of transistor 70, and input terminal 134 is directly connected to the base of transistor 68. Capacitors 124, 128, provide D.C. isolation between bidirectional transistor 102 and transferee flip-flop 56.

Outer zone terminal 136 of bidirectional transistor 104 is connected by gate resistor 138 to output terminal 140 of flip-flop 56. Outer zone terminal 142 of bidirectional transistor 104 is connected by gate resistor 144 to the output terminal 146 of flip-flop 56. Capacitor 148 connects output terminal 150 of gate 98 to outer zone 136, and capacitor 152 connects output terminal 154 to outer zone terminal 142 of bidirectional transistor 104. Output terminal 150 is directly connected to input terminal 156 of flip-flop 58, and output terminal 154 of gate 98 is directly connected to input terminal 158 of flip-flop 58. Input terminals 156, 158 of flip-flop 58 are directly connected to the bases of transistors 78, 76, respectively, of flip-flop 58.

Outer zone terminal 160 of bidirectional transistor 106 is connected by gate resistor 162 to the output terminal 164 of flip-flop 58. Outer zone terminal 166 is connected by gate resistor 168 to output terminal 170 of flip-flop 58. Terminals 164, 170 serve as output terminals of flip-flop 58 and as input terminals of gate 100. Capacitor 172 connects output terminal 174 of gate 100 to outer zone terminal 160, and capacitor 176 connects outer zone terminal 178 to outer zone 166 of bidirectional transistor 106. Output terminal 174, 178 of gate 100 will be normally applied to the input terminal of the next succeeding stage or flip-flop, of register 52, if such a stage is provided. Terminals 174, 178 may be connected respectively to input terminals 180, 182 of flip-flop 54 if provision for end-around carry is desired in shift register 52.

Control, or shift, pulses are adapted to be applied to shift terminal 184 which is directly connected to the base, or intermediate zones, 186, 188, 190 of bidirectional transistors 102, 104, 106 so that shift pulses applied to shift terminal 184 will be substantially simultaneously applied to the bases of each of the bidirectional transistors of all the gates connected to shift terminal 184.

It is possible to design circuits using p-n-p junction transistors, for example, of the alloy, grown, or surface barrier types in the common emitter configuration, so that the transistors of such circuits will saturate, or bottom, if the potentials of their bases with respect to their emitters, which are generally at ground potential, are within a voltage range of from $-0.3$ v. to $-\text{v.}_{cc}$, heretofore denoted the "1" voltage range, and so that the transistors will be substantially biased off if the potentials of their bases with respect to their emitters are within a voltage range of from $-0.1$ v. to ground, heretofore denoted the "0" voltage range. These voltage ranges obviously may vary depending upon the characteristics of the transistors used, as is well known in the art. In such circuits the potential of the collector of a saturated or bottomed, transistor will be within the "0" voltage range, and the collector of a cut off transistor will be in the "1" voltage range. When the collector of a first transistor is connected to the base of a second transistor in a similar configuration, the second transistor will be cut off when the first transistor is bottomed, and the second transistor will be bottomed when the first transistor is cut off. The devices described and illustrated as examples of embodiments of the invention use transistor circuits having substantially such characteristics. It is not, however, necessary that the transistors saturate in the circuits used, but only that the potentials of their collectors have separate and distinct voltage ranges depending upon whether the transistors are conducting or cut off.

In order to simplify the explanation of shift register 52, the operation of a single flip-flop, flip-flop 54 and the operation of bidirectional gate 96, with which it is associated, will be made in greater detail. The operation of flip-flops 56, 58 will be substantially the same as that of flip-flop 54 and that of their associated bidirectional gates will be substantially the same as that of bidirectional gate 96.

If it is assumed initialy that transistor 60 is cut off, then the potential of its collector 122 which is connected through load resistor 192 to a source of collector supply potential $-v_{cc}$, which is not illustrated, will be within the "1" voltage range. The base of transistor 62, which is connected by base resistor 66 to output terminal 118 and collector terminal 122, will also be within the "1" voltage range. As a result, transistor 62 will saturate and the potential of its collector 120, which is connected through load resistor 196 to $v_{cc}$, and of output terminal 112 will be within the "0" voltage range. Since the base of transistor 60 is connected by base resistor 64 to terminals 112, 120, the potential of the base of transistor 60 will be within the "0" voltage range, which maintains transistor 60 cut off. Flip-flop 54 will remain in the above described stable state until signals of the proper polarity are applied to one or both of its input terminals 180, 182. Terminal 112, which is also an input terminal, of gate 96 is thus within the "0" voltage range and terminal 118, which is also an input terminal, of gate 96 is in the "1" voltage range. If transistor 62 is considered to correspond to switch $S_1$ and transistor 60 is considered to correspond to switch $S_2$, gate 96 is in the condition described in line 3 of FIG. 6. The application of a shift pulse to shift terminal 184 will cause gate 96 to produce a negative going pulse at terminal 126 and a positive going pulse at terminal 130. These pulses cause transistor 70 to turn on, if it is not already turned on; and transistor 68 to cut off, if it is not already cut off.

When gate 96 is in this third condition, the leading edge of a shift pulse applied to terminal 184 will cause bidirectional transistor 102 to conduct and transistor 102 will conduct as long as the pulse is present, or applied. The resistance between terminals 108, 114 will be small compared with the resistance of gate resistors 110, 116 and thus terminal 108 will become more negative and terminal 114 will become more positive until they both have approximately the same potential. The change of potential of terminal 114 is applied to a differentiating circuit which is formed by capacitor 128 and primarily by the resistance of base resistor 72 of flip-flop 56 when transistor 70 is saturated, or by capacitor 128 and primarily by the emitter to base resistance of transistor 68 when transistor 68 is saturated. Irrespective of the state of flip-flop 56, when the leading edge of the shift pulse is applied to gate 96, the amplitude and duration of pulse applied to the base of transistor 68 is sufficient to turn transistor 68 "off" if the pulse is positive or to turn it "on" if the pulse is negative. Similarly, the changes of potential of terminal 108 are applied to a differentiating circuit comprised of capacitor 124 and primarily by the resistance of base resistor 74, or primarily by the emitter to base resistance of transistor 70, depending upon the state of flip-flop 56. At the termination of each shift pulse transistor 102 cuts off and terminals 108, 114 will substantially assume the values of terminals 112, 118 at a rate of change of potential which is relatively slow because of the value of gate resistors 110, 116. As a result, the voltage pulses applied to the input terminals of flip-flop 56, at the termination of each shift pulse are of insufficient amplitude to cause flip-flop 56 to change state.

If transistor 60 of flip-flop 54 is saturated or bottomed, then the potential of its collector 122 and output terminal 118 will be within the "0" voltage range. Since the base of transistor 62 is connected by base resistors 66 to terminals 118, 122, transistor 62 will be cut off. Collector 120 of transistor 62 and output terminal 112 of flip-flop 54 will be within the "1" voltage range as is the base of transistor 60, so that transistor 60 will be maintained in its saturated or bottomed condition. When flip-flop 54 is in this state, input terminal 112 of gate 96 will be within the "1" voltage range and input terminal 118 of gate 96 will be within the "0" voltage range, so that the condition of gate 96 is described in line 2 of FIG. 6. The leading edge of a shift pulse applied to shift terminal 184 and to the base 186 of bidirectional transistor 102 will cause bidirectional transistor 102 to conduct. A positive going pulse is produced at output terminal 126 and a negative going pulse is produced at output terminal 130. These pulses, which are applied to input terminal 132, 134, of flip-flop 56, will cause flip-flop 56 to change to the stable state in which transistor 68 is conducting and transistor 70 is cut off, if flip-flop 56 is not already in this state.

By definition, flip-flop 54 is designated as being in its "0" state when its collector 122 and output terminal 118 are within the "0" voltage range, and is defined as being in its "1" state when collector terminal 122 and output terminal 118 are within the "1" voltage range. This convention is also used to describe the stable states of flip-flops 56 and 58. Since flip-flop 54, for example, can have only two stable states, gate 96 is restricted to two conditions. These conditions are those described in lines 2 and 3 of FIG. 6.

Flip-flop 54 may be placed or set in its "0" state by the application of a negative set pulse of sufficient amplitude and duration to set transistor 84. The application of such a pulse to transistor 84 causes transistor 84 to saturate. This lowers the potential of collector terminal 122 of transistor 60 so that it is within the "0" voltage range. As a result, output terminal 118, input terminal 180 and the base of transistor 62 are also placed within the "0" voltage range, which cuts off transistor 62. When transistor 62 is cut off the potential of its collector 120 is within the "1" voltage range. As a consequence, output terminal 112, input terminal 182 and the base of transistor 60 will likewise be within the "1" voltage range so that transistor 60 will conduct and remain saturated when the set pulse terminates. The application of a reset pulse to reset transistor 86 will cause the flip-flop 54 to change to the "1" stable state. It should be understood that means other than set and reset transistors may be used to place a flip-flop in either of its two stable states.

FIG. 2 is a chart describing the permutations of the states of flip-flops 54, 56, together with certain selected states of flip-flop 58. Flip-flops 54, 56, 58 may be placed in the states indicated in FIG. 2 by the application of appropriate set and reset pulses to the set and reset transistors of flip-flops 54, 56, 58. The application of a shift pulse to shift terminal 184 will cause flip-flops 54, 56, 58, to assume the stable states indicated in the corresponding line of FIG. 3. The states of flip-flop 58 were chosen so that flip-flop 58 will change state each time a shift pulse is applied to shift terminal 182. It should be noted that flip-flop 54 does not change state when a shift pulse is applied to shift terminal 184 since no means are illustrated for applying signals to the input terminals 180, 182 of flip-flop 54.

If flip-flops 54, 56, 58 are placed in the "0," "0," "1" states respectively, then a shift pulse applied to shift terminal 184 will cause bidirectional gate 96 to produce a negative going pulse at output terminal 130 and a positive going pulse at output terminal 126. Since flip-flop 56 is in the "0" state with input terminal 132 in the "0" voltage range and input terminal 134 in the "1" voltage range, these pulses will not cause flip-flop 56 to change state. Since each shift pulse applied to terminal 84 is substantially simultaneously applied to gates 96, 98, 100, bidirectional gate 98 will produce a posiitve going pulse at output terminal 150 and a negative going pulse at output terminal 154 at substantially the same time as gate 96 is producing output pulses. The negative going pulse produced at terminal 154 will turn on transistor 76 which is cut off when flip-flop 58 is in the "1" state, and will turn off transistor 78 which is conducting when flip-flop 58 is in the "1" state. The output pulses of gate 98 will, therefore, cause flip-flop 58 to change from the "1" state to the "0" state. The output pulses produced by gate 100, if applied to proper input terminals of a succeeding flip-flop, will cause the succeeding flip-flop to change to the "1" state. The output pulses produced by gates 96, 98 will cause flip-flops 56, 58 to assume the stable states indicated in line 1 of FIG. 3.

If flip-flops 54, 56, 58 are placed in the "0," "1," "0" states as indicated in line 2 of FIG. 2, a shift pulse applied to shift terminal 184 will cause bidirectional gate 96 to produce a positive going pulse at output terminal 126 and a negative going pulse at output terminal 130. These pulses will cause flip-flop 56 to change from the "1" to the "0" state. Gate 98 will produce a positive going pulse at output terminal 154 and a negative going output pulse at output terminal 150. These pulses, when applied to the input terminal of flip-flop 58, will cause flip-flop 58 to change from the "0" to the "1" state. This same shift pulse will cause bidirectional gate 100 to produce output pulses, which could change a succeeding flip-flop to which these pulses may be applied, to the "0" state. When flip-flops 56 and 58 have settled down after the application of the output signals from gates 96, 98, the states of these flip-flops are as described in line 2 of FIG. 3.

If flip-flops 54, 56, 58 are placed in the "1," "0," "1" states, the shift pulse applied to input terminal 184 will cause gate 96 to produce output pulses which will cause flip-flop 56 to change to the "1" stable state. At substantially the same time, gate 98 will produce output pulses which will cause flip-flop 58 to change to the "0" state. Gate 100 will produce output pulses which, if applied to the proper input terminals of the succeeding flip-flop, would cause the flip-flop to change to the "1" state. When flip-flops 56, 58 settle down after the application of pulses from gates 96, 98, the states of flip-flops 54, 56, 58 are as described in line 3 of FIG. 3.

If flip-flops 54, 56, 58 are placed in the "1," "1," "0" states as described in line 4, FIG. 2, a shift pulse applied to shift terminal 184 will cause gate 96 to produce output pulses which could change flip-flop 56 to the "1" state. However, since flip-flop 56 is in the "1" state, the signals produce no change in the state of flip-flop 56. Gate 98 produces output signals which cause flip-flop 58 to shift to the "1" state. Gate 100 produces output signals which, if applied to the proper input terminals of a succeeding flip-flop, would cause that flip-flop to assume the "0" state. When flip-flops 56, 58 have settled down after the application of pulses from gates 96, 98, the stable states of flip-flops 54, 56, 58, are as described in line 4 of FIG. 3. A comparison of FIGS. 2, 3, shows that binary information initially represented by the stable states of flip-flops 54, 56 has been shifted to the right one place where it is represented by the stable states of flip-flops 56, 58 as a consequence of the application of shift pulses to shift terminal 184.

From the foregoing description of the operation of a portion of a shift register 52 illustrated in FIG. 1, it is believed obvious that the number of stages that a given register is comprised of is a matter of choice. If it is desired to provide for end-around carry of information in a register, the output terminals of the bidirectional gate of the $n$'th flip-flop terminals 174, 178 of flip-flop 58 of register 52, may be connected to the input terminals of the first flip-flop; i.e., input terminals 180, 182 of flip-flop 54.

From the description of the operation of the gate illustrated in FIG. 5, it is believed clear that the change of state of flip-flop 56; for example, while a shift pulse is applied to the base 188 of bidirectional transistor 104 of gate 98 will not cause gate 98 to produce a second set of output pulses. The reason for this is that terminals 136, 412 will be maintained substantially at the same potential while the bidirectional transistor 104 is conducting. The change of state of flip-flop 56 due to the application of pulses from gate 54, for example, will not produce any significant change in the potentials of terminals 136, 142. As a result, there is no need to limit the width of each shift pulse applied to shift terminal 184, or to incorporate delay circuits between a flip-flop and its associated gate.

Noise pulses produced when the capacitors such as capacitors 148, 152 of gate 98, for example, recharge at the termination of a shift pulse are of insufficient amplitude, for the reasons set forth above, to trigger the transferee flip-flop 58.

The push-pull outputs produced by the simplified bidirectional gates cause the transferee flip-flop to complete a change of state in a shorter period of time than when a pulse is applied to only one input terminal of the transferee flip-flop. This is because the "on" transistor is being turned "off" at the same time the "off" transistor is being turned "on." Thus, the period of time between the application of a push-pull signal to a flip-flop and the time when the flip-flop has completed the transition to a new stable state, which time is sometimes referred to as being the settling down time, is substantially decreased. Because of the time required to recharge the isolating capacitors 148, 152, in gate 98, for example, the maximum rate at which the simplified bidirectional gates may produce output signals is reduced as compared with bidirectional gates which are not A.C. coupled to the transferee flip-flop. However, in many applications, this characteristic is more than compensated for by the shorter settling down period of the flip-flops when push-pull signals are applied to them.

It should be noted that it is not necessary to apply both output signals from a gate to one flip-flop, since either one of the two output pulses produced is capable of causing a flip-flop to change state. Thus, one of the two output pulses can be used to change the state of one transferee flip-flop, and the other pulse is available for such additional uses as may be desired, such as resetting a preceding flip-flop to a predetermined state. Each outer zone terminal such as terminal 152 of bidirectional transistor 104 may be A.C. coupled to more than one input terminal with, however, a decrease in maximum operating frequency.

FIG. 4 is a block diagram of a portion of a register 196 which has provisions for shifting the binary data represented by the states of flip-flops, to the left and to the right; and for parallel read-in of the binary data to flip-flops of register 198. Register 196 is illustrated as being comprised of flip-flops 200, 202, 204, 206, 208. The exact number of flip-flops is a matter of choice. The circuits necessary to transfer data represented by the stable states of flip-flops 202, 204, 206, to the left, to the right, and to flip-flops 210, 212, 214 of register 198 are illustrated in FIG. 4. Flip-flop 200 is provided to illustrate how the state of flip-flop 202 may be shifted to the left, and flip-flop 208 is provided to illustrate how the state of flip-flop 206 may be shifted to the right. The input terminals of shift right gate 216, the input terminals of shift left gate 218, and the input terminals of parallel read-in gate 220 are connected in parallel with the output terminals 222, 224 of flip-flop 202. Similarly the input terminals of shift right gate 226, the input terminals of shift left gate 228, and the input terminals of parallel read-in gate 230 are connected in parallel with the output terminals 232, 234 of flip-flop 204. The input terminals of shift right gate 236, the input terminals of shift left gate 238, and the input terminals of parallel read-in gate 240 are also connected in parallel with output terminals 242, 244 of flip-flop 206.

The output terminals of gate 216 are connected in the proper manner to input terminals 246, 248 of flip-flop 204, the output terminals of gate 226 are connected to input terminals 250, 252 of flip-flop 206, and the output terminals of gate 236 are connected to input terminals 254, 256 of flip-flop 208. The output terminals of shift left gate 218 are connected in the proper manner to input terminals 258, 260 of flip-flop 200, the output terminals of gate 228 are connected to the input terminals 262, 264 of flip-flop 202 and the output terminals of flip-flop 238 are connected to the input terminals 246, 248 of flip-flop 204. The output terminals of parallel read-in gate 220 are connected in the proper manner to input terminals 266, 268 of flip-flop 210, the output terminals of parallel read-in gate 230 are connected to input terminals 270, 272 of flip-flop 212 and the output terminals of gate 240 are connected to input terminals 274, 276 of flip-flop 214.

Shift right terminal 278 is connected to the shift terminals of gates 216, 226, 236, shift left terminal 280 is connected to the shift terminals of gates 218, 228, 238, and parallel read-in terminal 282 is connected to the shift terminals of gates 220, 230, 240.

Each of the flip-flops illustrated in block form in FIG. 4 may have substantially the same structure as that of flip-flop 54 in FIG. 1, for example. Similarly, each of the gates illustrated in block form in FIG. 4 may have substantially the same structure as that of gate 96 in FIG. 1, for example. Each of the flip-flops in FIG. 4 is illustrated as being provided with set and reset terminals such as terminals 284, 286 of flip-flop 202 in order that each flip-flop may be set in a predetermined stable state.

When a shift pulse is applied to shift right terminal 278, shift right gates 216, 226, 236 will produce output signals. The type of output signals each gate produces is determined by the stable states of their associated flip-flops, 202, 204, 206 at the time the leading edge of the shift pulse is applied to the shift right gates. The output pulses produced by gates 216, 226, 236 will cause transferee flip-flops 204, 206, 208 to assume the same stable state that transferor flip-flops 202, 204, 206 were in when the shift pulse was applied to shift right terminal 278. When a shift left pulse is applied to shift left terminal 280, shift left gates 218, 228, 238, will produce output signals. The type of output signal each produces is determined by the states of transferor flip-flops 202, 204, 206 when the leading edge of the shift left pulse reaches the shift left gates. The output pulses produced by the shift left gates will cause transferee flip-flops 200, 202, 204 to assume the same stable states that flip-flops 202, 204, 206 were in when the shift left pulse was initially applied to shift left terminal 280. Similarly when a parallel read-in pulse is applied to parallel read-in terminal 282, parallel read-in gates 220, 230, 240 will produce output pulses which will cause transferor flip-flops 210, 212, 214 of register 198 to assume the same stable states that transferee flip-flops 202, 204, 206 were in when the leading edge of the parallel read-in pulse is applied to the parallel read-in gates.

The state of any of the flip-flops illustrated in FIG. 1 or FIG. 4 may be determined by the potential of one or of both of its output terminals. In the example of the embodiments of the invention illustrated in FIG. 1, all transistors have been illustrated and described as being p-n-p transistors. As is well known in the art, n-p-n transistors may be substituted for p-n-p transistors provided that the polarity of the supply voltage and the polarity of the triggering signals are reversed.

In a preferred example, all the transistors illustrated in FIG. 1 including bidirectional transistors such as bidirectional transistor 102 of gate 96, are type 2N113's, which type of transistor is non-symmetric. The lack of symmetry between the junctions of a 2N113 transistor does not adversely affect the operation of the bidirectional gates. Other types of transistors obviously may be used than those described. Symmetrical transistors, such as a 2N184 may be used for the bidirectional transistors with a slight improvement in output capability of the gates.

The values and/or types of components appearing in FIG. 1 of the drawing are included by way of example only as being suitable for the devices illustrated. Each of the flip-flops 56, 58 and gates 98, 100 of FIG. 1 and the flip-flops and gates illustrated in block form in FIG. 4 may have component values substantially the same as those indicated for flip-flop 54 and gate 96. It is to be understood that circuit specifications in accordance with the invention will vary with the design for any particular application.

Obviously, many modifications and variations of the present invention are possible in the light of the above teachings. It is, therefore, to be understood that within the scope of the appended claims the invention may be practiced other than as specifically described and illustrated.

I claim:

1. In combination: a first and a second flip-flop; each of said flip-flops having two stable states; bidirectional gate means; circuit means connecting said gate means to said first flip-flop; circuit means adapted to apply control signals to said gate means; said gate means producing, in response to each control signal, push-pull output signals of one type when said first flip-flop is in its first stable state and producing push-pull output signals of a second type when said first flip-flop is in its second stable state; and alternating current coupling means for applying the push-pull output signals produced by said gate to said second flip-flop, said second flip-flop being adapted to assume one of its two stable states when output signals of said one type are applied to it, and to assume the other of its stable states when said output signals of said second type are applied to it.

2. In combination: a first and a second flip-flop; each of said flip-flops having a first and a second stable state, a first and a second input terminal and a first and a second output terminal; each of said flip-flops being so designed that when it is in its first stable state, its first output terminal and first input terminal will be within a first voltage range, and its second output terminal and second input terminal will be within a second voltage range, and when each flip-flop is in its second stable state, said first output terminal and said first input terminal will be within said second voltage range, and said second output terminal and said second input terminal will be within said first voltage range; circuit means for placing said first flip-flop in one or the other of its two stable states; a bidirectional gate having first and second input terminals, first and second output terminals, and a shift terminal adapted to have shift pulses applied thereto; said first and second input terminals of said gate being connected respectively to the first and second output terminal of the first flip-flop; and circuit means connecting the first and second output terminals of said gate respectively to the first and second input terminals of said second flip-flop; said gate, in response to each shift pulse applied thereto, producing push-pull output pulses at its two output terminals, said push-pull output pulses being of one type when said first flip-flop is in its first stable state, and of a second type when said first flip-flop is in its second stable state, said output pulses adapted to cause said second flip-flop to assume a stable state corresponding to the stable state of the first flip-flop at the time of application of each shift pulse to said gate.

3. In combination: a first and a second flip-flop; each of said flip-flops having a first and a second stable state, a first and a second input terminal and a first and a second output terminal; each of said flip-flops being so designed that when it is in its first stable state, its first output terminal and first input terminal will be within a first voltage range, and its second output terminal and second input terminal will be within a second voltage range, and when each flip-flop is in its second stable state, said first output terminal and said first input terminal will be within said second voltage range, and said second output terminal and said second input terminal will be within said first voltage range; circuit means for placing said first flip-flop in one or the other of its two stable states; a bidirectional transistor having an intermediate zone and a first and a second outer zone; a first gate resistor connecting the first outer zone to the first output terminal of the first flip-flop, a second gate resistor connecting the second outer zone of the bidirectional transistor to the second output terminal of the first flip-flop, first alternating current coupling means connecting the second input terminal of the second flip-flop to the first outer zone of the bidirectional transistor, second alternating current coupling means connecting the first input terminal of the second flip-flop to the second outer zone of the bidirectional transistor; and circuit means adapted to apply shift pulses to the intermediate zone of said bidirectional transistor, said bidirectional transistor, in response to shift pulses applied to its base zone, causing push-pull voltage pulses to be applied to the input terminals of the second flip-flop which cause the second flip-flop to assume the same stable state the first flip-flop was in when each shift pulse is initially applied to said bidirectional transistor.

4. In combination: a first and a second flip-flop; each of said flip-flops comprising a first and a second transistor; each of said transistors having a base, an emitter and a collector; a first base resistor connecting the collector of the second transistor to the base of the first transistor; a second base resistor connecting the collector of the first transistor to the base of the second transistor; a first load resistor connecting the collector of first transistor to a source of collector potential; a second load resistor for connecting the collector of said second transistor to a source of collector potential; circuit means connecting the emitters of the first and second transistors to a point at reference potential; circuit means for selectively placing said first flip-flop in one or the other of its two stable states; a bidirectional transistor having a first outer zone, an intermediate zone, and a second outer zone; a first gate resistor for connecting the first outer zone of the bidirectional transistor to the collector of the second transistor of the first flip-flop; a second gate resistor for connecting the second outer zone of the bidirectional transistor to the collector of the first transistor of the first flip-flop; a first capacitor for connecting the first outer zone of the bidirectional transistor to the base of the second transistor of the second flip-flop; a second capacitor connecting between the second outer zone of the bidirectional transistor to the base of the first transistor of the second flip-flop; and circuit means adapted to apply shift pulses to the intermediate zone of the bidirectional transistor.

5. In combination: $n$ flip-flops where $n$ is an integer greater than one; each of the flip-flops comprising a first and a second cross-coupled junction transistor, $n$ bidirectional gates comprising a bidirectional transistor having a base and two outer zones; each of said bidirectional gates being associated with a different one of said flip-flops; alternating current coupling means connecting at least one outer zone of each bidirectional transistor to the base of one of the transistors of a flip-flop with which each gate is not associated; a shift terminal adapted to have shift pulses applied thereto; and circuit means connecting said shift terminal to the bases of each of the bidirectional transistors of said gate.

6. In combination: $n$ flip-flops where $n$ is an integer greater than one; each of the flip-flops comprising a first and a second cross-coupled transistor, $n$ bidirectional gates comprising a bidirectional transistor having a base and two outer zones; each of said gates being associated with a different one of said flip-flops; circuit means respectively connecting each outer zone of each of said bidirectional transistors to the respective collectors of the transistors of the flip-flop with which each gate is associated; alternating current coupling means connecting at least one outer zone of each bidirectional transistor to the base of one of the transistors of a flip-flop with which each gate is not associated; a shift terminal adapted to have shift pulses applied thereto; and circuit means connecting the shift terminal to the bases of each of the bidirectional transistors of said gate.

7. In combination: $n$ flip-flops; each of said flip-flops having a first and a second stable state, a first and a second input terminal and a first and second output terminal; each of said flip-flops being so designed that when it is in its first stable state, its first output terminal and first input terminal will be in a first voltage range and the second output terminal and second input terminal will be in a second voltage range; and when each flip-flop is in its second stable state, said first output terminal and said first input terminal will be within said second voltage range and said second output terminal and said second input terminal will be in said first voltage range; circuit means for placing each of the flip-flops in one or the other of their two stable states; $n$ bidirectional transistors, each transistor having an intermediate zone, and a first and a second outer zone; each bidirectional transistor being associated respectively with a different one of said flip-flops; a first gate resistor connecting the first outer zone to the first output terminal of the flip-flop with which said gate is associated; a second gate resistor connecting the outer zone of the bidirectional transistor to the second output terminal of the flip-flop with which each gate is associated; first alternating current coupling means connecting the second input terminal of a different one of said flip-flops to the first outer zone of each bidirectional transistor and second alternating current coupling means connecting the first input terminal of said different one of said flip-flops to the second outer zone of each of the bidirectional transistors; circuit means adapted to apply shift pulses substantially simultaneously to the intermediate zones of said bidirectional transistors, each of said bidirectional transistors in response to each shift pulse applied to its base zone producing push-pull voltage pulses, which push-pull pulses cause the flip-flop to which the pulses produced by each gate are applied to assume the stable state of the flip-flop with which each bidirectional transistor is associated at the time the shift pulse is first applied to each of said gates.

8. A shift register comprising $n$ flip-flops, where $n$ is an integer greater than one; each of said flip-flops having a pair of input terminals, a pair of output terminals, and two stable states; $n$ shift left bidirectional gates; $n$ shift right bidirectional gates; and $n$ parallel read-in gates; each of said gates having a pair of input terminals, a pair of output terminals, a shift terminal, and a biderectional transistor having a pair of outer zones and an intermediate zone; circuit means connecting the outer zones of the bidirectional transistor respectively to the output terminals of the gate, resistive circuit means connecting the outer zones of the bidirectional transistor respectively to the input terminals of the gate, and circuit means connecting the intermediate zone of the bidirectional transistor to the shift terminal; the input terminals of a shift left gate, a shift right gate, and a parallel read-in gate being connected respectively to the output terminals of a different one of said flip-flops; whereby, a shift right, a shift left and a parallel read-in bidirectional gate is associated with each flip-flop of the register; the output terminals of each shift right gate being connected to the input terminals of the flip-flop to the right of the flip-flop with which each shift right gate is associated; the output terminals of each shift left gates being connected to the input terminals of the flip-flop to the left of the flip-flop with which each shift left gate is associated; and the output terminals of each parallel read-in gate adapted to be connected to the input terminals of corresponding flip-flops in another register; a shift right terminal adapted to have shift right pulses applied to it; a shift left terminal adapted to have shift left pulses applied to it; a parallel read-in terminal adapted to have parallel read-in pulses applied to it; circuit means connecting the shift terminals of each of the shift right gates to the shift right terminal; circuit means connecting each of the shift terminals of the shift left gates to the shift left terminal; and circuit means connecting the shift terminals of the parallel read-in gates to the parallel read-in shift terminal; each of said gates causing the flip-flop to which its output terminals are connected to assume a stable state corresponding to that of the flip-flop with which each of said gates is associated at the time a shift pulse is first applied to said gate.

9. In combination: a first and a second flip-flop, each of the flip-flops having two stable states and an input terminal; a bidirectional gate, said gate comprising a bidirectional transistor having a base and two outer zones; circuit means connecting the bidirectional gate to the first flip-flop to enable said first flip-flop to control the direction of a signal transmitted through said gate; alternating current coupling means connecting at least one of the outer zones of said bidirectional transistor to an input terminal of the second flip-flop, said alternating current coupling means to apply a first type signal from said bidirectional gate when the signal transmitted through said gate is in one direction and to apply a second type signal from said bi-directional gate when the signal transmitted through said gate is in the other direction; a shift terminal adapted to have shift pulses applied thereto, and circuit means connecting the base of the bidirectional transistor to the shift terminal.

References Cited in the file of this patent

UNITED STATES PATENTS

| | | |
|---|---|---|
| 2,478,683 | Bliss | Aug. 9, 1949 |
| 2,594,731 | Connolly | Apr. 29, 1952 |
| 2,706,811 | Steele | Apr. 19, 1955 |
| 2,719,228 | Auerbach et al. | Sept. 27, 1955 |
| 2,785,304 | Bruce et al. | Mar. 12, 1957 |
| 2,801,334 | Clapper | July 30, 1957 |